United States Patent [19]

Duschl

[11] Patent Number: 4,480,264
[45] Date of Patent: Oct. 30, 1984

[54] CHARGE COUPLED DEVICE BASED SYSTEM AND METHOD FOR MEASURING PROJECTED FIGURES

[75] Inventor: Robert A. Duschl, Lancaster, Pa.

[73] Assignee: RCA Corporation, New York, N.Y.

[21] Appl. No.: 388,029

[22] Filed: Jun. 14, 1982

[51] Int. Cl.$^3$ .................. H04N 9/62; H04N 7/18; H04N 7/02

[52] U.S. Cl. .................................. 358/10; 358/107; 358/139; 356/384

[58] Field of Search ................ 358/10, 139, 107, 213; 382/53; 356/124, 394, 375, 383, 384

Primary Examiner—John C. Martin
Assistant Examiner—Luan Nguyen
Attorney, Agent, or Firm—Eugene M. Whitacre; Dennis H. Irlbeck; Lester L. Hallacher

[57] ABSTRACT

A system for measuring figures projected onto a charge coupled device (CCD) sums the data from a preselected number of adjacent pixels in a particular pixel line. The sum signal is divided by a full pixel signal to provide a mean pixel signal. The mean pixel signal is multiplied by a dimension per pixel value to provide a dimension signal representative of the dimension being measured. The dimension signal is compared with a reference dimension to determine the acceptability of the figure being measured.

7 Claims, 5 Drawing Figures

CHARGE COUPLED DEVICE BASED SYSTEM AND METHOD FOR MEASURING PROJECTED FIGURES

BACKGROUND OF THE INVENTION

This invention relates generally to systems and methods employing a charge coupled device (CCD) and particularly to such a system and method for measuring figures projected onto a CCD.

Charge coupled devices are finding use in a wide range of equipment requiring image sensing, such as verifying the acceptability of images or geometric figures. CCDs are used in conjunction with an optical lensing system which focuses the light from the object being investigated onto the CCD. Varying amounts of light on the individual pixels within the CCD array charge the pixels to different levels proportional to the incident light. The optical information from the object is, therefore, available in analog form across the pixels of the CCD array. The analog information is shifted out of the CCD and converted into digital form and stored in a digital memory where the various characteristics of the object can be investigated by the proper manipulation of the digital information. The individual pixels within a CCD array typically are closely spaced and are arranged horizontally in rows and vertically in columns so that a given CCD imaging device will provide a fixed number of pixels of information. As an example, the SID52501 CCD available from RCA Corporation has 320 vertical columns of pixels and 512 horizontal rows of pixels. Accordingly, the information is read out from the CCD and stored in 320 vertical columns and 512 horizontal rows. The pixels of a CCD are charged in proportion to the impinging energy. Accordingly, precise measurements of a geometric figure can be made by utilizing the differences in charge levels resulting from the partial illumination of some pixels. For example, a pixel which is only half illuminated because it is located near the edge of a figure receives half the charge of a fully illuminated pixel. Charge level variations of small percentages such as 5% are detectable so that precise measurements of figures projected onto a CCD can be made by utilizing the charge level variations. A CCD is also useful in imaging devices which generate figures by scanning because the CCD receives and stores the figure data without being scanned. Thus, the image which is generated by a scanning device, such as a kinescope, can be projected onto a CCD in a single frame without concern for the scanning rate of the kinescope. The data stored on the CCD can then be transferred to a digital storage device and processed by techniques needed to investigate scanned images. For these reasons, and because of the close spacing of the pixels, one ideal use for CCDs is that of measuring geometric figures by casting an image of the figure onto the CCD. The convergence of a color television kinescope can be measured by generating red, green and blue color bars on the kinescope and measuring the widths of the bars using a CCD.

The instant invention utilizes the advantages of a CCD by the provision of a CCD based figure measuring system and method wherein the charges received by each pixel within a pixel line of the CCD are summed and divided by a maximum charge per pixel value to provide a mean pixel signal which is multiplied by a dimension per pixel value to provide a dimension of the figure.

CROSS REFERENCE TO RELATED APPLICATIONS

Application Ser. No. 388,143 entitled "CHARGE COUPLED DEVICE INSPECTION SYSTEM AND METHOD": filed of even date herewith by R. A. Duschl describes a system in which the claimed invention can be used.

SUMMARY OF THE INVENTION

A system for measuring figures projected onto a charge coupled device (CCD) sums the data from a number of adjacent pixels in a particular pixel line. The summed signal is divided by a maximum signal to provide a mean pixel signal which is multiplied by a dimension per pixel value to provide a dimension signal representative of the dimension being measured. The dimension signal can be stored or compared with a reference dimension to determine the acceptability of the figure being measured.

DETAILED DESCRIPTION OF THE PREFERRED EMBODIMENT

Figure 1:
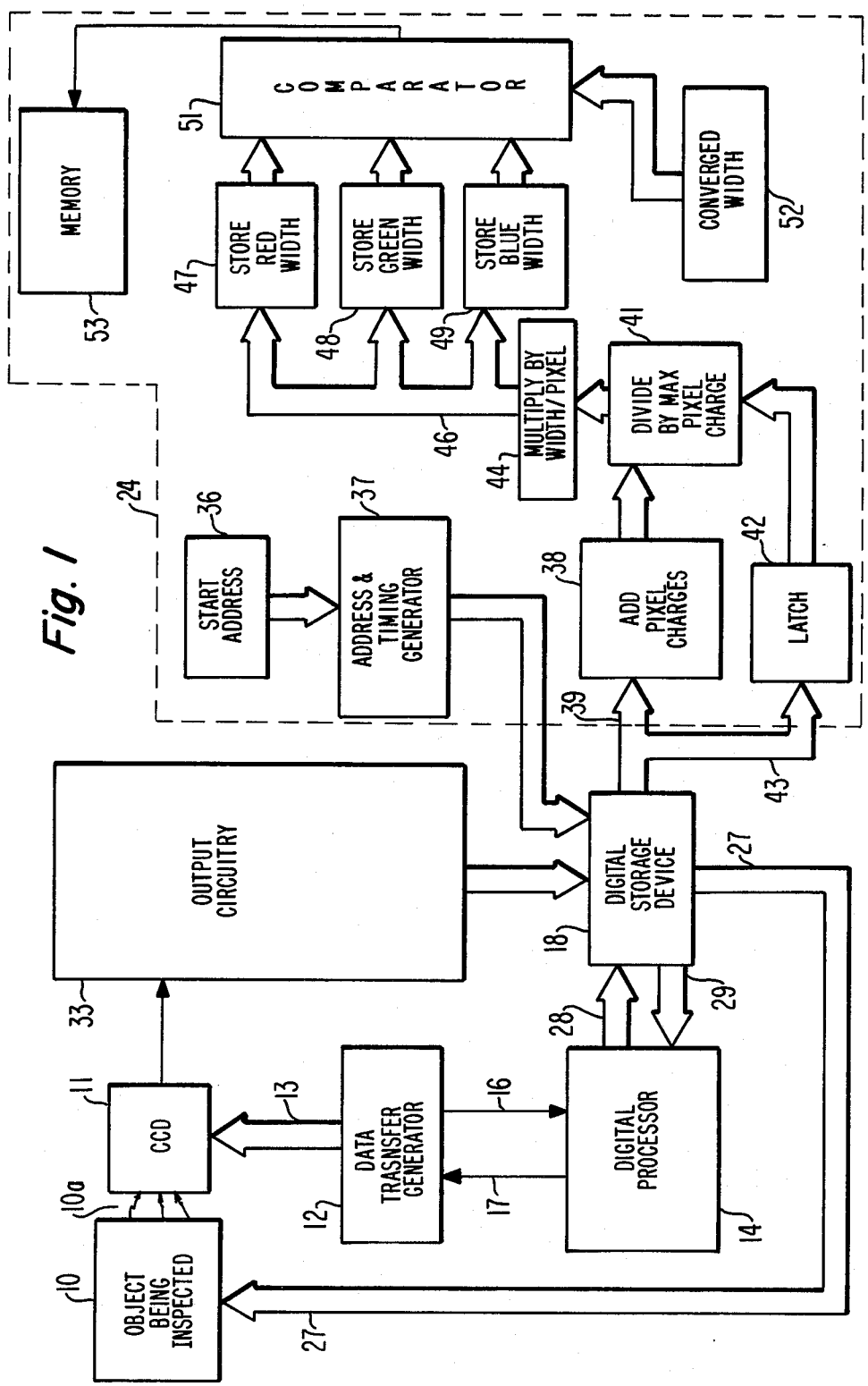
FIG. 1 is a CCD inspection system incorporating a preferred embodiment of a figure measuring system reduced to practice using hardware.

FIG. 1 shows a system including a charge coupled device (CCD) 11 for inspecting an object 10. The object 10 being inspected is illuminated to cast either a light image or a shadow of a figure to be measured onto the CCD. In one preferred embodiment, the object 10 is a kinescope for a color television receiver and the inspection being performed is the measurement of convergence on the kinescope by imaging red, green and blue bars onto the CCD. The light rays 10a eminating from the screen 10 impinge upon the CCD and each pixel of the CCD is charged proportionately to the amount of light energy received. A data transfer generator 12 is coupled to the CCD 11 by output lines 13. The data transfer generator 12 transfers the analog information from the CCD to a frame store, or digital storage device 18. The transfer of the data from the CCD to the storage device 18 can be effected through output circuitry 33 in a manner described in patent application Ser. No. 388,143 fully referenced hereinabove, or in any other manner within the purview of one skilled in the art.

The generator 12 and a digital processor 14 communicate through two connecting lines 16 and 17. The digital processor 14 also communicates with the storage device 18 through the connections 28 and 29. The digital processor 14 can be a PROM, EPROM or RAM depending upon the flexibility and speed required for the particular inspection being performed. The digital storage device 18 also is coupled to the object being tested 10 by line 27. The digital storage device 18 also communicates with a figure measuring system 24 which is fully described hereinbelow.

In operation, the object 10 being measured is illuminated and an image is projected onto the CCD to charge each pixel within the CCD array proportionately to the amount of impinging light. The analog data on the CCD are read out to and stored in the digital storage device 18 so that the stored data are representative of the image received from the object 10. The stored image data can then be processed by the figure measuring system 24 to measure any desired dimension of the figure which casts the image onto the CCD. The image which is cast upon the CCD 11 can be either a light image which is transmitted through a light transparent figure or a shadow which is cast by a light opaque figure. Alternatively, the image can be color bars which are generated upon the screen of a color television kinescope for the purpose of measuring for misconvergence of the electron beams within the tube. In the measurement of misconvergence, the color bars have a known horizontal dimension which is unaffected by misconvergence. The correct locations of the bars on the kinescope are known so that specific pixels of the CCD array are charge by the color bars when there is no misconvergence problem. In the presence of misconvergence, one or more of the color bars is displaced and one, or more, of the specific pixels is either uncharged or only partially charged. This change in charge makes the misconverged bars appear shorter and the apparent change in bar width is used as a measurement of the misconvergence. Irrespective of the type of figure being measured, the system is calibrated so that a maximum, known charge is available on a fully exposed pixel. Accordingly, every fully exposed pixel represents a known fraction of the dimension being measured. The percentage of charge on a partially charged pixel is directly proportional to the percentage of exposure of the pixel and thus is a measure of the figure projected onto the CCD.

The color bar or figure is measured by summing the charges on the specific pixels and dividing the sum by a maximum pixel charge value to obtain a mean pixel value. The summing technique includes any partially exposed pixels which lie at the edges of the figure being measured. The mean pixel value is multiplied by the dimension per pixel to obtain the dimension being measured. The measured dimension can be compared to a reference dimension to verify that the dimension falls within established tolerances. The dimension also can be stored in a memory device.

The measuring system 24 of FIG. 1 includes a start address generator 36 and an address and timing generator 37. When the system is used to measure misconvergence of a kinescope, the red, green and blue color bars are generated at precise locations on the kinescope. Typically, a plurality of sets of color bar patterns, such as twenty-five, are generated at known locations on the kinescope screen. The data from all color bar patterns are projected onto the CCD in a single frame period of the kinescope. Accordingly, a large number of color bar sets can be investigated for misconvergence in a single frame time because of the characteristics of a CCD and the unique data processing capabilities of the claimed invention.

The locations of the color bar patterns on the screen are known and, therefore, the specific pixels which are charged by the bars with the convergence is correct are also known. The address and timing generator 37 provides the addresses of the horizontal row of specific pixels to the digital storage device 18. The data from the row of pixels are transferred to an adder 38 over the output line 39. The adder 38 sums the individual charges and transfers a summed signal to a divider 41. A latch circuit 42 also is controlled by the digital storage device 18 by way of an output line 43. The latch 42 sets the divider 41 after all the pixel charges are transferred to the adder 38 from the digital storage device 18. The latch 41, therefore, prevents division before all the pixel data are received by the adder. The divider 41 divides the summed signal by a maximum pixel charge signal to provide a mean charge signal to a multiplier 44. By calibration of the system, each fully charged pixel of the CCD represents a dimension per pixel, or specific increment of the dimension being measured. The multiplier 41 multiplies the mean signal by the dimension per pixel value and provides a dimension signal representative of the total dimension being measured. The dimension signal is available on the output line 46 and can be stored in the appropriate memory 47, 48 or 49 depending upon whether the red bar, the green bar or the blue bar is being measured.

The output from the memories 47, 48 and 49 are sequentially provided to a comparator 51 which also receives an input from a reference signal generator 52. The reference signal generator 52 provides a signal which is representative of the optimum dimension being measured. The reference signal is compared to the measured signal and provides an output when the measured signal exceeds the referenced signal by a predetermined amount. When the system is used to measure the convergence of a kinescope, the reference signal from the generator 52 is a converged width signal representative of the optimum width of the color bars for a perfectly converged kinescope. The output of the comparator 51 is a misconvergence signal when the measured bar width exceeds the converged width signal by an amount which would be objectionable to the viewer of a color kinescope. The misconvergence signal is provided to a memory 53 wherein the bar color and amount of misconvergence are stored.

Figures 3A, 3B, 3C:
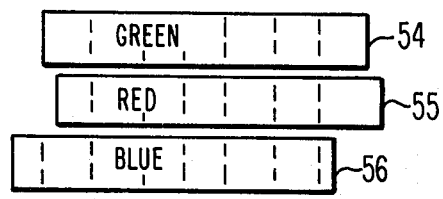
FIGS. 3a to 3c show how the charges on adjacent pixels within horizontal rows are used to measure either the width of a figure or the misconvergence of a color television kinescope.

FIGS. 3a, 3b and 3c are useful in understanding how misconvergence results in an apparent width change of the color bars. In FIG. 3a, a green color bar 54 is projected onto seven pixels of one horizontal row of the CCD array. It should be noted that in reality, the number of pixels illuminated by the bar could be in excess of seven. The locations of the color bars are known and, therefore, misconvergence can be measured by noting the displacement of the bar edges. Accordingly, only a small percentage of the received data must be processed to accurately measure misconvergence. Also, typically, a plurality of horizontal rows will be measured for each color bar and the results of the individual measurements averaged. This averaging can be effected in the memories 47, 48 and 49 prior to being input to the comparator 51. In FIG. 3b, the green bar 54 of FIG. 3a fully illuminates all the pixels G1 through G7 and all the pixels are fully charged to a value E as shown in FIG. 3c. Thus, the green bar 54 is properly converged and a misconvergence signal is not provided by the comparator 51. The left edge of the red color bar 55 of FIG. 3a is slightly displaced to the right and the pixel R1 of FIG. 3b is partially charged to a value ER1 which, as shown in FIG. 3c, is lower than the charges ER2 through ER7 on the pixels R1 through R7. Accordingly, the sum signal for these pixels R1 to R7 is lower than the sum signal for the pixels G1 to G7 which are illuminated by the green color bar. When the difference between the sum signal and a reference exceeds the permissible misconvergence of an acceptable color television kinescope, the comparator 51 (FIG. 1) provides a misconvergence signal to the memory 53. The right edge of the red bar 55 also is displaced to the right. The same technique can be used to measure misconvergence with this edge to verify the results obtained using the left edge.

In FIG. 3a, the left edge of the blue color bars 56 is displaced to the left with respect to the properly aligned green color bar 54 and the pixels B1 to B7 of FIG. 3b are charged to the levels EB1 to EB7 shown in FIG. 3c. The pixel EB7 is charged to a lower level than the charges EB1 to EB6 and the sum signal will be less than the sum signal for the green bar.

The calculation for misconvergence is sequentially made for each of the three color bars 54, 55 and 56 as follows:

MC = misconvergence = Dref − D
where Dref is the reference output of signal generator 52, and:

$$D = \left( \sum_{n=1}^{n=x} E/E\text{max.} \right) (EP)$$

where:
D = dimension being measured, for example, the width of one of the bars 54, 55 or 56 of FIG. 3a.
= the sum of the charges E on the first to first to the Xth adjacent pixels, e.g. ER1 to ER7 of FIG. 3c.
E max = the value of the charge on a fully illuminated pixel.
E/E max = mean pixel value
EP = dimension represented by a fully charged pixel, in mils/pixel The instant invention is also useful in measuring the dimension of geometric figures. Thus, for example, the green, red and blue bars 54, 55 and 56 respectively of FIG. 3a instead can be light images cast through transparent slits in an opaque object. In such a use, the actual widths of the slits can be measured, and the reference signal used to compare the measured width with the optimum width established by the reference. Alternatively, the locations of the edges of the slit can be determined, and the actual edge locations compared to reference edge locations to determine whether the measured figure is within the established tolerances. Also, the height of the geometric figure can be measured. In this measurement, the charges on the pixels within a portion of a vertical column are processed to measure actual heights or to compare top and bottom figure locations with reference locations. Thus, the illuminated pixels used in the measurement can be portions of pixel lines which are either vertical or horizontal.

Figure 2:
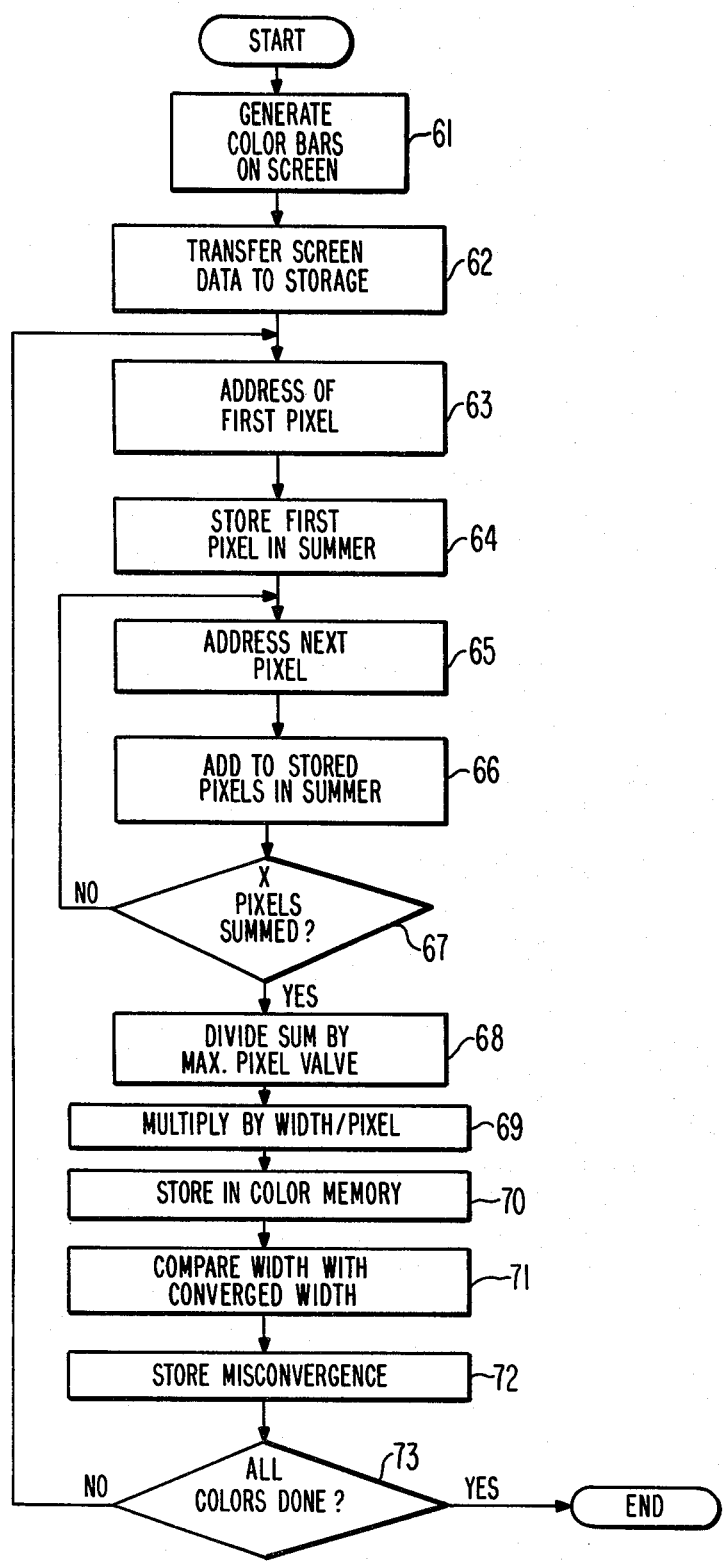
FIG. 2 is a flow chart of a preferred embodiment of a figure measuring system reduced to practice using software.

FIG. 2 is a flow chart of a preferred embodiment of the geometric figure measuring system 24 when the system is reduced to practice using software. When the digital processor 14 of FIG. 1 has sufficient memory capacity, the data transfer functions and the figure measuring functions, can be sequentially performed by the processor. In FIG. 2, at functional block 61, the digital processor 14 provides the digital storage device 18 with the necessary data and red, green and blue color bars are simultaneously generated on the screen of the kinescope being tested. At functional block 62, the color bars are imaged onto the CCD 11 and the data are transferred through the output circuitry 33 (FIG. 1) to the digital storage device 18. Prior to the transfer of image data to the digital storage device 18, the color bar generating data are removed from the device 18. At functional block 63, the start address 36 and address timing generator 37 provide the digital storage device with the address of the first pixel where the color bar being investigated begins when the convergence is correct. At functional block 64, the charge on the first pixel such as G1, R1, or B1 is provided and the charge is transferred to the adder 38 and added to the previously stored charge at functional block 66. At functional block 67, after the charges from all (X) pixels are added, which for example, in FIG. 3b is seven, the sum signal is divided by the full pixel signal Emax to provide the mean pixel value at functional block 68. At functional block 69, the mean pixel value is multiplied by the width per pixel signal EP to obtain a dimension signal which is representative of a dimension of the figure being investigated. At functional block 70, the dimension signal is transferred to storage and when misconvergence is being measured in a color kinescope, the measured signal is transferred to a particular color memory. At functional block 71, the width signals are compared with a reference, or converged width signal and at functional block 71, when the comparison shows a difference which is in excess of an acceptable difference, a misconvergence signal is generated and provided to the memory 53. At functional block 73, after the first color is completed, the system returns to the functional block 63 to do the next succeeding color. Also, at functional block 73 when all three colors are completed, the system operation ends.

What is claimed is:

1. A system for measuring figures projected onto a charge coupled device (CCD) having a plurality of pixels arranged in pixel lines including horizontal rows and vertical columns, and including output circuitry for transferring data from said CCD to a digital storage device to store the data from each pixel of said CCD at specific addresses within said digital storage device whereby the horizontal and vertical dimensions of said figure are measurable by the number of pixels in said pixel lines, comprising:
   means for receiving the data from a number of adjacent pixels in a particular pixel line and for summing said signals to provide a summed signal;
   divider means for receiving said summed signal and for dividing said summed signal by a full pixel signal to provide a mean pixel signal;
   multiplier means for receiving said mean pixel signal and multiplying said mean pixel signal by a dimension per pixel value to provide a dimension signal representative of a dimension of said figures; and
   means for storing said dimension signal.

2. The system of claim 1 wherein said pixel line is a horizontal row and said figures are red, blue and green color bars for measuring the convergence of a color kinescope and wherein said means for storing includes means for individually storing the widths of said red, blue and green bars.

3. The system of claim 2 further including comparator means for receiving said red, blue and green widths and comparing said widths with a converged width signal to provide a misconvergence signal when said convergence signal exceeds said width signal by a predetermined amount.

4. The system of claim 1 or 2 or 3 wherein said dimension (D) is calculated in accordance with:

$$D = \left( \sum_{n=1}^{n=x} E/E\text{max} \right) (EP)$$

where: $\sum_{n=1}^{n=x} E$ = the sum of the charge $E$ on the first to the $X$th adjacent pixels.

$E$ max = the value of the charge on a fully illuminated pixel.

$EP$ = dimension represented by a fully charged pixel.

5. A method of measuring a figure comprising the steps of:

casting an image of said figure onto a CCD and transferring the CCD data to a digital storage device wherein the data are stored in pixel lines in accordance with the horizontal rows and vertical columns of pixels on said CCD;

summing the charge data from a number of adjacent pixels in a pixel line to provide a summed signal;

dividing said summed signal by a full pixel signal to obtain a mean signal; and multiplying said mean signal by a dimension per pixel value to provide a dimension of said figure.

6. The method of claim 5 wherein said figure consists of red, green and blue color bars from a kinescope for measuring misconvergence of said kinescope and further including the steps of individually measuring the widths of said color bars and comparing said widths with a converged width signal and providing a misconvergence signal when said width exceeds said converged width signal by a predetermined amount.

7. The method of claim 5 or 6 further including the step of comparing said dimension signal with a reference signal to provide a difference signal when the difference exceeds a predetermined amount.

* * * * *